UNITED STATES PATENT OFFICE.

RUDOLF REYHER, OF ELBERFELD, GERMANY, ASSIGNOR TO THE FARBEN-FABRIKEN, VORMALS FR. BAYER & CO., OF SAME PLACE.

AZINE DYE.

SPECIFICATION forming part of Letters Patent No. 557,022, dated March 24, 1896.

Application filed April 20, 1895. Serial No. 546,554. (Specimens.)

*To all whom it may concern:*

Be it known that I, RUDOLF REYHER, chemist, doctor of philosophy, a subject of the Emperor of Russia, (assignor to the FARBEN-FABRIKEN, VORMALS FR. BAYER & CO., of Elberfeld, Prussia, Germany,) residing at Elberfeld, Prussia, Germany, have invented a new and useful Improvement in the Manufacture of Azine Dyes; and I declare the following to be an exact and clear description of my invention.

My invention relates to the production of an azine dye obtainable from condensing salts of nitroso derivatives of secondary aromatic amins, such as nitroso-monomethyl (or monoethyl) anilin or nitroso-monomethyl (or monoethyl) orthotoluidin, with phenylmetatoluylendiamin, (or paratolylmetatoluylendiamin,) valuable red azine dyes being produced in this manner, which are distinguished by their brilliancy and fastness on washing and exposure to light.

The aforesaid phenylmetatoluylendiamin (or paratolylmetatoluylendiamin) can be obtained according to the following method: A mixture of one part, by weight, of metatoluylendiamin hydrochlorid (or the corresponding quantity of another salt of metatoluylendiamin) with four parts, by weight, of anilin is heated during about twenty hours at from 250° to 270° centigrade in a vessel capable of withstanding pressure. An excess of soda-lye having been added, the unaltered anilin is then distilled over by means of steam. The remaining oil is separated while hot from the alkaline solution and is boiled with water in order to remove unaltered metatoluylendiamin, if any be present. The oil thus obtained is mixed with a slight excess of muriatic acid and a large quantity of water, and the mixture is boiled until it is apparent that no more of the oily mass will dissolve. The residue having been separated by filtration, a filtrate is obtained containing merely the hydrochlorid of phenylmetatoluylendiamin, which, owing to its slight solubility in cold water, separates in the form of brilliant scales or flat needles as the liquid cools. In order to obtain the base, the hot solution in water of the said phenylmetatoluylendiamin hydrochlorid is mixed with a small quantity of muriatic acid, digested with animal charcoal, and after filtration the filtrate is mixed with ammonia liquor. The phenylmetatoluylendiamin is precipitated as a light oil, which crystallizes after a time. The base can be purified by crystallization from ligroin and forms in a pure state star-shaped groups of snow-white prismatic crystals, melting at from 69° to 70° centigrade, having the formula:

The process takes place in an analogous manner if in the foregoing process a corresponding quantity of paratoluidin (or other homologues thereof) is used in place of anilin. Of course the method for obtaining the aforesaid phenylmetatoluylendiamin can be varied in a different manner, viz: instead of heating salts of metatoluylendiamin with free primary amins, the free metatoluylendiamin can be heated with salts of primary amins. Such variations, however, are known to every experienced chemist, and need not be further illustrated.

According to my researches the above phenylmetatoluylendiamin (or paratolylmetatoluylendiamin) may be easily condensed with nitroso derivatives of secondary aromatic amins, or generally with all "substances" whose behavior is known to be analogous to that of these nitroso compounds, such as monoalkylated amidoazobenzene or the like.

In carrying out my invention practically I can, for example, proceed as follows: 19.8 parts, by weight, of phenylmetatoluylendiamin are dissolved in ninety parts, by weight, of alcohol, and twenty-eight parts, by weight, of nitroso-monomethylorthotoluidin hydrochlorid are gradually added to the cold solution. The reaction mixture, which becomes warm spontaneously, is stirred until the nitroso compound is no longer distinguishable. The liquid is then heated in a vessel provided with a reflex condenser until it acquires a pure bright-red color. As the mixture cools, the dye separates in crystals, for the most part, which are isolated by filtration, washing with alcohol and drying. Another method for isolating the dye consists in distilling off the alcohol, mixing the residue with hot water, and mixing then the liquid with a solution of common salt. On cooling, the dyestuff separates in crystals, which are filtered off, pressed, and dried. The dyestuff forms, when pulverized, a brown powder with metallic luster, readily soluble in water, ammonia liquor, and alcohol, with a red color, insoluble in soda-lye. By concentrated sulfuric acid (66° Baumé) it is dissolved with a green color, which turns into blue on the addition of a small quantity of ice-water to the sulfuric-acid solution. If a very large quantity of water is added to the aforesaid sulfuric-acid solution, the green solution turns gradually from violet-red to red. If the solution of the dyestuff in water is mixed with soda-lye, reddish-brown flakes separate from the watery solution. The dyestuff produces on cotton mordanted with tannin brilliant-red shades of great fastness to the action of alkali and light. The coloring-matter thus produced has probably the following formula:

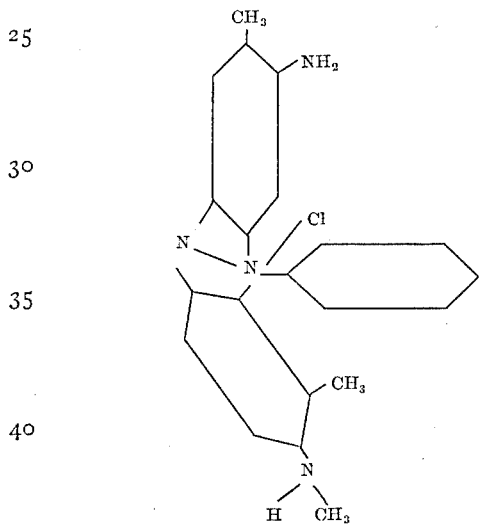

Analogous dyestuffs are obtained if in the foregoing example the nitroso-monomethylorthotoluidin is replaced by nitroso-monomethylanilin nitroso-monoethylanilin or nitroso-monoethyl orthotoluidin or if paratolylmetatoluylendiamin is condensed with the said or similar nitroso derivatives of secondary aromatic amins. The dyes thus obtained yield in general shades somewhat more violet-red than those produced by the dye defined in the example.

Having now described my invention and in what manner the same is to be performed, what I claim as new, and desire to secure by Letters Patent, is—

1. The process for the production of azine dyes, which process consists in condensing salts of nitroso derivatives of secondary aromatic amins with phenylmetatoluylendiamin in the manner hereinbefore described.

2. As new articles of manufacture the azine dyes obtainable from condensing salts of nitroso-monomethylorthotoluidin salts of nitroalkyl toluidin or anilin with phenylmetatoluylendiamin having in case nitroso-monomethylorthotoluidin and phenylmetatoluylendiamin are used probably the following formula:

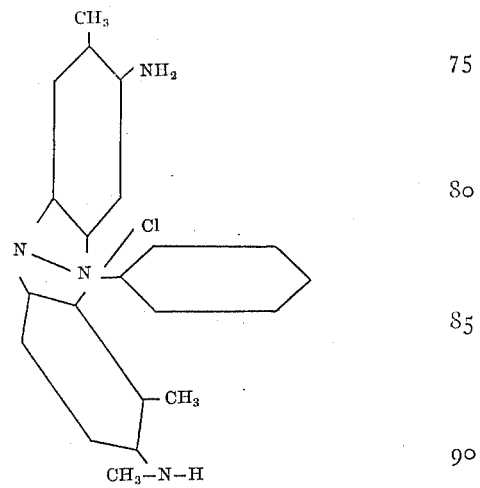

forming a brown powder with metallic luster, easily soluble in water and alcohol with a red color, insoluble in soda-lye, soluble in concentrated sulfuric acid (66° Baumé) with a green color which turns first into blue on the addition of small quantity of ice-water to the sulfuric-acid solution and finally from violet-red to red on the addition of a very large quantity of water producing on cotton mordanted with tannin brilliant-red shades of great fastness to the action of alkali and light.

In testimony whereof I have signed my name in the presence of two subscribing witnesses.

RUDOLF REYHER.

Witnesses:
F. H. STRAUSS,
A. STRAUSS.